United States Patent
Desai et al.

(10) Patent No.: US 11,044,634 B2
(45) Date of Patent: Jun. 22, 2021

(54) NEIGHBORHOOD AWARE LOAD BALANCING

(71) Applicant: Cisco Technology, Inc., San Jose, CA (US)

(72) Inventors: Vishal Satyendra Desai, San Jose, CA (US); Santosh Babaji Kulkarni, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/433,308

(22) Filed: Jun. 6, 2019

(65) Prior Publication Data

US 2020/0389816 A1    Dec. 10, 2020

(51) Int. Cl.
| | |
|---|---|
| *H04W 28/08* | (2009.01) |
| *H04W 48/20* | (2009.01) |
| *H04L 12/803* | (2013.01) |
| *H04W 24/08* | (2009.01) |
| *H04W 48/08* | (2009.01) |
| *H04L 12/26* | (2006.01) |
| *H04L 29/08* | (2006.01) |
| *H04W 8/00* | (2009.01) |
| *H04W 48/18* | (2009.01) |

(52) U.S. Cl.
CPC .......... *H04W 28/08* (2013.01); *H04L 43/045* (2013.01); *H04L 47/125* (2013.01); *H04L 67/16* (2013.01); *H04W 8/005* (2013.01); *H04W 24/08* (2013.01); *H04W 48/08* (2013.01); *H04W 48/18* (2013.01); *H04W 48/20* (2013.01)

(58) Field of Classification Search
CPC . H04L 41/12; H04L 43/0876; H04L 43/0882; H04L 67/16; G06F 3/061
See application file for complete search history.

(56) References Cited

U.S. PATENT DOCUMENTS

| | | | |
|---|---|---|---|
| 9,179,363 B2 | 11/2015 | Siomina et al. | |
| 9,288,717 B2 | 3/2016 | Jang | |
| 9,686,718 B2 | 6/2017 | Sarawat et al. | |
| 9,867,083 B2 | 1/2018 | Liu et al. | |
| 10,028,195 B2 | 7/2018 | Luo et al. | |
| 2008/0112363 A1* | 5/2008 | Rahman | H04W 8/005 370/331 |
| 2008/0280621 A1* | 11/2008 | Soomro | H04W 48/08 455/450 |

(Continued)

*Primary Examiner* — Barbara B Anyan
(74) *Attorney, Agent, or Firm* — Polsinelli PC

(57) ABSTRACT

Systems, methods, computer-readable media, and devices are disclosed for collecting access point telemetry. A first access point is identified that is associated with a single instance on a pod. A hash identifier is identified, where the hash identifier identifies a radio frequency (RF) neighborhood of the first access point based on a geographical location of the first access point. Subsequent access point members of the RF neighborhood are dynamically determined by dynamically assigning a second access point to the RF neighborhood, the dynamic assignment based on the second access point being within a threshold geographical location to the first access point. Telemetry from the second access point is directed towards the single instance on the pod, where the pod receives telemetry for all access points in the dynamically determined RF neighborhood.

20 Claims, 6 Drawing Sheets

(56) References Cited

U.S. PATENT DOCUMENTS

| | | | |
|---|---|---|---|
| 2012/0196644 A1* | 8/2012 | Scherzer | H04W 48/18 |
| | | | 455/524 |
| 2017/0272317 A1* | 9/2017 | Singla | H04W 24/08 |
| 2017/0272507 A1* | 9/2017 | Hotchkiss | H04L 67/16 |
| 2019/0116504 A1* | 4/2019 | Rusackas | H04L 43/045 |

* cited by examiner

NEIGHBORHOOD AWARE LOAD BALANCING

TECHNICAL FIELD

The present disclosure relates generally to the collection of telemetry, and more specifically, to directing telemetry towards an instance on a specific network device.

BACKGROUND

With the proliferation of wireless network deployments, many vendors in the WLAN space offer cloud based management services that enable the management of several hundreds or even thousands of Access Points (APs) in a "single pane of glass" dashboard. All of the Cloud-based WLAN management solutions have a dedicated resource management embedded to manage complex problems pertaining to Wi-Fi deployments. Since there could be multiple instances of the resource management running side-by-side at any given time, it is desirable to have telemetry traffic from all APs in a given radio frequency neighborhood (RFN) going/redirected to the same service instance in order to reduce overall latency.

However existing load balancing techniques fail to achieve this challenge. Management services perform load-balancing optimization purely based on the network load metrics and do not take into consideration inter-node proximity.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Figure 1:
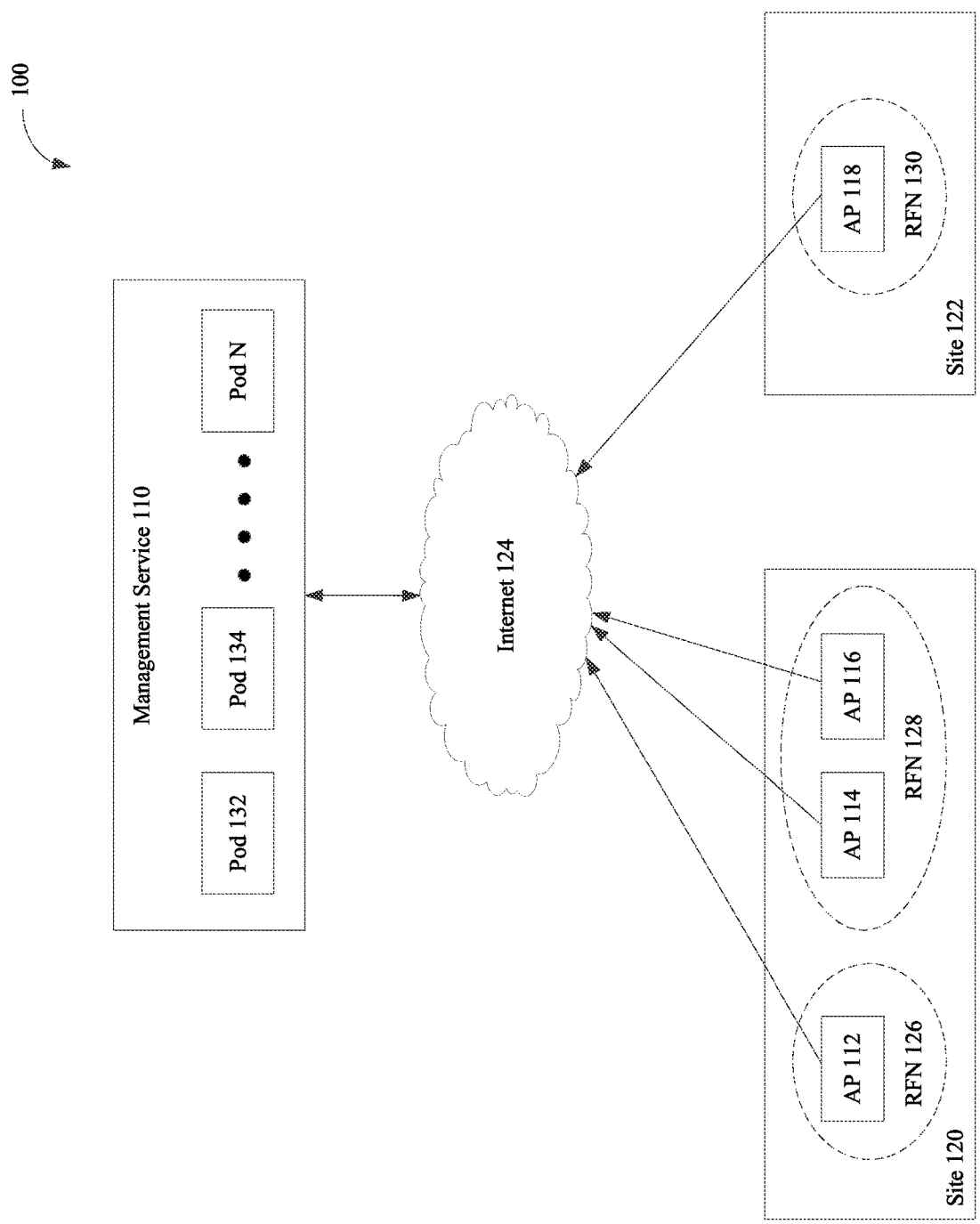
FIG. 1 illustrates an example network environment for collecting telemetry from access points in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

Systems, methods, computer-readable media, and devices are disclosed for collecting access point telemetry. A first access point is identified that is associated with a single instance on a pod. A hash identifier is identified, where the hash identifier identifies a radio frequency (RF) neighborhood of the first access point based on a geographical location of the first access point. Subsequent access point members of the RF neighborhood are dynamically determined by dynamically assigning a second access point to the RF neighborhood, the dynamic assignment based on the second access point being within a threshold geographical location to the first access point. Telemetry from the second access point is directed towards the single instance on the pod, where the pod receives telemetry for all access points in the dynamically determined RF neighborhood.

Example Embodiments

The disclosed technology addresses the need in the art for a load balancing technique that can optimize resource utilization, maximize throughput, reduce latency, and ensure fault-tolerant configurations for localized radio frequency (RF) sectors and thereby ensure optimal load-balancing for Wi-Fi access nodes located in either a single geographical area or with similar characteristics into similar containers.

In some embodiments, a method for collecting access point telemetry includes identifying a first access point associated with a single instance on a pod. The method further includes identifying a hash identifier for a radio frequency (RF) neighborhood of the first access point based on a geographical location of the first access point. The method additionally includes, dynamically determining subsequent access point members of the RF neighborhood by dynamically assigning a second access point to the RF neighborhood based on the second access point being within a threshold geographical location to the first access point. The method also includes directing telemetry from the second access point towards the single instance on the pod, wherein the pod receives telemetry for all access points in the dynamically determined RF neighborhood.

In some embodiments, the threshold geographical location is based on an identification by the second access point that the second access point can hear a signal from the first access point at a threshold strength.

In some embodiments, the method also includes receiving, from the second access point, the hash identifier in a header associated with traffic from the second access point, wherein the second access point inherits the hash identifier based on being assigned to the RF neighborhood.

In some embodiments, each of the access point members of the dynamically determined RF neighborhood self-monitors their surroundings.

In some embodiments, the telemetry includes one or more key performance metrics associated with interference, noise, utilization, and radar performance.

In some embodiments, the method further includes receiving the one or more key performance metrics from the second access point and access point members of the dynamically determined RF neighborhood, and based on analyzing the one or more key performance metrics, determining a best band, channel, channel width, or power for each access point within the dynamically determined RF neighborhood.

In some embodiments, the one or more key performance metrics is continuously updated as each of the access point members of the dynamically determined RF neighborhood send updates to the telemetry as radio frequency (RF) conditions change over time.

In some embodiments, a system for collecting access point telemetry includes a first access point in communication with a single instance on a pod within a network, a second access point in communication with the network, and a management service for determining radio frequency (RF) neighborhoods. In some embodiments, the management service identifies the first access point associated with a single instance on a pod, identifies a hash identifier for the RF neighborhood of the first access point based on a geographical location of the first access point, dynamically determines subsequent access point members of the RF neighborhood by dynamically assigning the second access point to the RF neighborhood based on the second access point being within a threshold geographical location to the first access point, and directs telemetry from the second access point towards the single instance on the pod, where the pod receives telemetry for all access points in the dynamically determined RF neighborhood.

In some embodiments, a non-transitory computer-readable medium includes instructions stored thereon, the instructions executable by one or more processors of a computing system to identify a first access point associated with a single instance on a pod; identify a hash identifier for a radio frequency (RF) neighborhood of the first access point based on a geographical location of the first access point; dynamically determine subsequent access point members of the RF neighborhood by dynamically assigning a second access point to the RF neighborhood based on the second access point being within a threshold geographical location to the first access point; and direct telemetry from the second access point towards the single instance on the pod, where the pod receives telemetry for all access points in the dynamically determined RF neighborhood.

FIG. 1 illustrates an example network environment for collecting telemetry from access points in accordance with some embodiments. System 100 can allow network administrators to manage distributed multi-site wireless networks with zero-touch provisioning, get network-wide visibility and control through a single portal, enforce automatic RF optimizations via management service 110, and perform seamless rolling firmware updates remotely and more. System 100 can provide powerful and intuitive cloud based centralized management with or without the complexity of traditional on-site Wireless LAN Controllers. In this architecture, in addition to serving a client's many access points, the access points in system 100 can themselves continuously monitor their surroundings and report their findings to management service 110.

For example, system 100 can include management service 110 in communication with one or more access points. In the example embodiment shown, management service 110 can be in communication with access point (AP) 112, AP 114, AP 116, and AP 118. System 100 can allow network administrators to logically group related APs into one or more "sites", such as AP 112, AP 114, and AP 116 within site 120 and AP 118 within site 122.

In some embodiments, the access points within each site can be dynamically and automatically grouped into RF neighborhoods (RFNs). For example, in site 120, AP 112 has been dynamically grouped into RFN 126 and AP 114 and AP 116 has been dynamically grouped into RFN 128. Likewise, AP 118 has been dynamically grouped into RFN 130 at site 122. Each RFN can determine how telemetry is routed from its member access points. For example, telemetry can be routed across a portion of similar links from a specific RFN based on load considerations.

In some embodiments, management service 110 can be on the cloud, such that AP 112, AP 114, AP 116, and AP 118 communicate with management service 110 through internet 124. Management service can include one or more pods that receive telemetry from access points belonging to a specific RFN. For example, pod 132 can receive telemetry from RFN 126 (e.g., for AP 112), pod 134 can receive telemetry from RFN 128 (e.g., for AP 114 and AP 116), and pod N can receive telemetry from RFN 130 (e.g., for AP 118). Each site can have one or more pods receiving telemetry from its RFNs.

In some embodiments, management service 110 can receive and analyze RF reports from AP telemetry, including key metrics like interference, noise, utilization and radars, etc. Management service 110 can compute the best band, channel, channel width and power for every radio/AP in a deployment, and then implement any corresponding changes to how the APs are implemented—thus enabling APs to stay on top of changing RF conditions. As with any cloud based service, management service 110 can auto-scale with load, meaning there could be multiple instances of a management application running side-by-side, processing incoming data at any given time.

Figure 2:
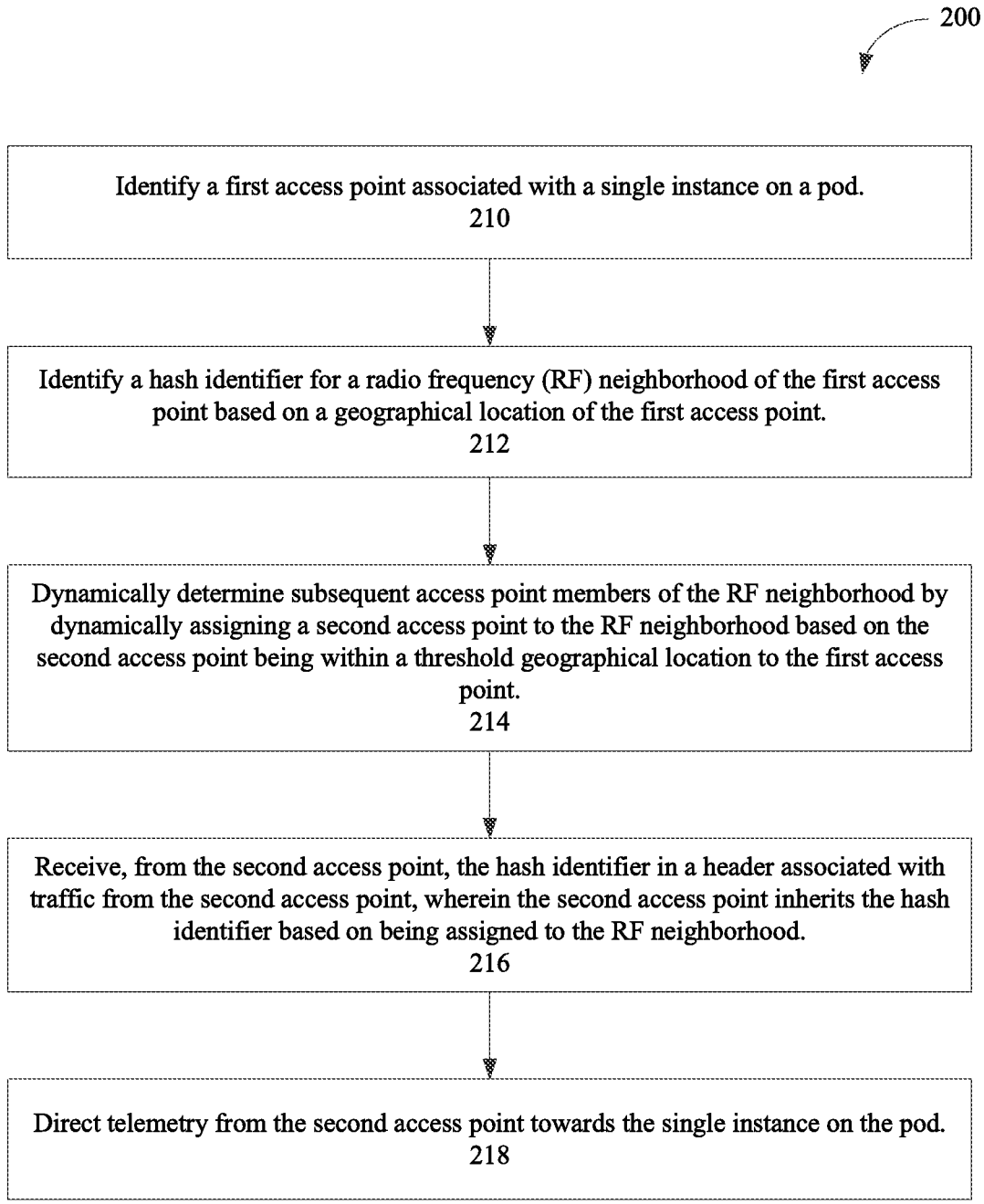
FIG. 2 is a flow chart illustrating an example embodiment of a telemetry management service in accordance with some embodiments.
Figure 3:
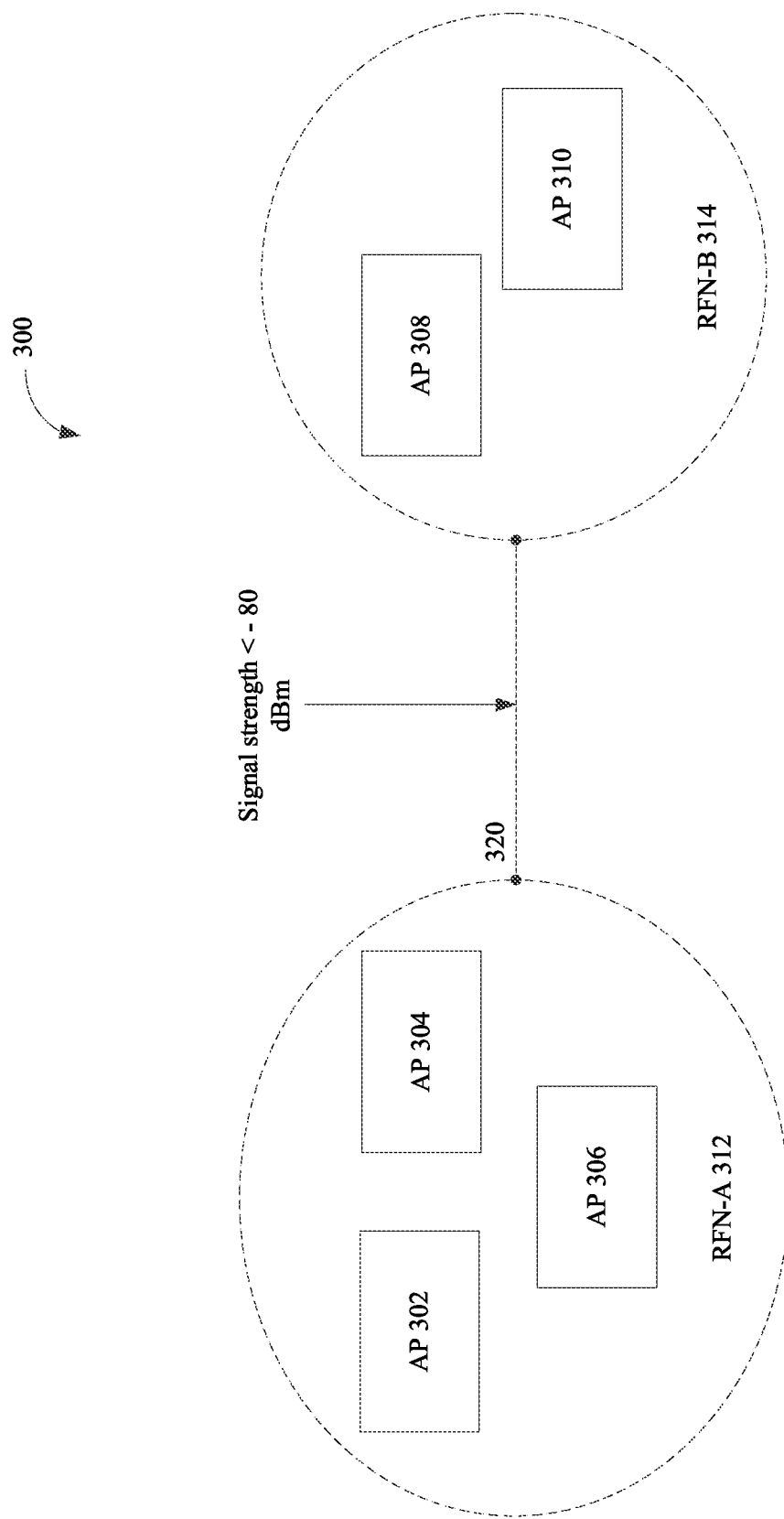
FIG. 3 illustrates example radio frequency (RF) neighborhoods in accordance with some embodiments.
Figure 4:
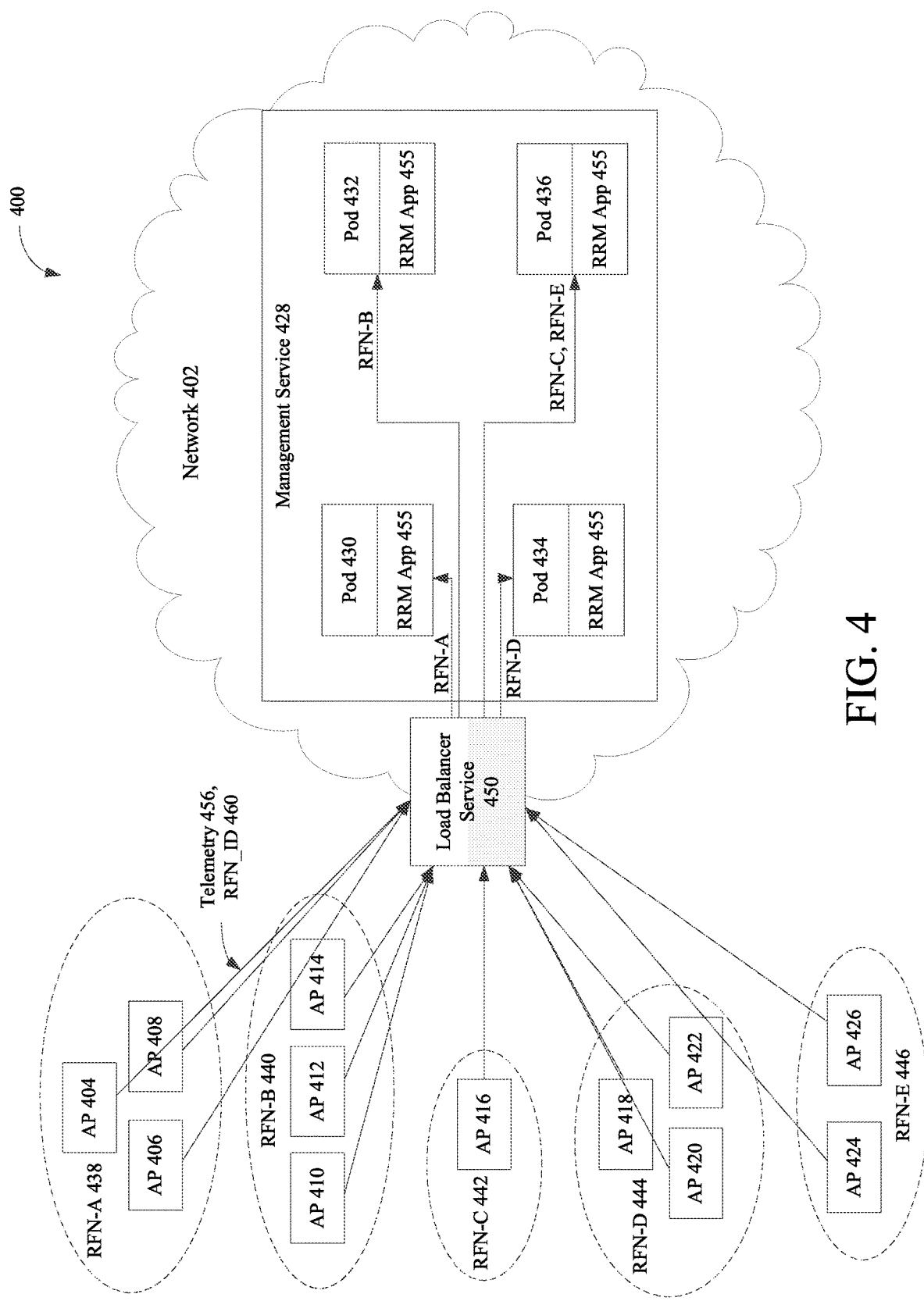
FIG. 4 illustrates an example network environment for collecting telemetry from access points in accordance with some embodiments.

FIG. 2 is a flow chart illustrating an example embodiment of a telemetry management service in accordance with some embodiments, which can be implemented by components similar to that of the systems of FIGS. 3 and 4. FIG. 3 illustrates example radio frequency (RF) neighborhoods in accordance with some embodiments, and FIG. 4 illustrates an example network environment for collecting telemetry from access points in accordance with some embodiments.

Network 402 can include management service 428, where management service 428 can include pod 430, pod 432, pod 434, and pod 436 in communication with access points (APs) AP 404, AP 406, AP 408, AP 410, AP 412, AP 414, AP 416, AP 418, AP 420, AP 422, AP 424, and AP 426. The pods can be in communication with the APs through load balancer service 450, which can be neighborhood-aware such that it can receive telemetry data from the APs and direct the telemetry data from all APs in a neighborhood (RFN) to the same service instance on a specific pod. Having all the relevant telemetry data available at the same service instance can, for example, reduce the overall latency of the service.

In method 200, after a node within system 400 receives telemetry from one or more APs, network 402 can load balance the telemetry from the one or more APs across the pods of network 402 (e.g., by identifying a first AP associated with a single instance on a pod) (step 210). For example, network 402 can include load balancer service 450 that can identify that telemetry from a certain AP, such as AP 404, is to be directed towards pod 430, which can handle traffic to radio frequency neighborhood RFN-A 438, which includes AP 404.

Management service 428 can determine and/or identify a hash identifier that identifies the RFN of the AP based on a geographical location of the AP (step 212). For example, if AP 404 is the first AP within a site or client network, then AP 404 can be assigned to RFN-A 438 based on its current location within the client's buildings (e.g., its latitude and longitudinal location as determined by GPS, manual addition, trilateral location techniques, etc.).

Subsequent access point members of the RFN can be dynamically determined by automatically and dynamically assigning other APs to an RFN based on the APs being within a threshold geographical location to the initial AP (step 214). For example, in FIG. 3, AP 302, 304, 306, 308, and 310 have been dynamically assigned to either RFN-A 312 or RFN-B 314. In this embodiment, AP 302 was initially assigned to RFN-A 312. When AP 304 and AP 306 joined the network, they were assigned to RFN-A 312 because they were within a certain distance 320 to AP 302 (e.g., 80 m). Likewise, AP 308 and AP 310 were assigned to RFN-B 314 because they were also within the threshold geographical location to each other, but outside of the threshold geographical distance 320 to AP 302 (or the other APs within RFN-A 312). As a result, all APs that are close to each other are dynamically grouped within the same RFN. This distance 320 can be set and/or changed by an administrator or a controller within the management service, and can account for any obstacles affecting the effect of signal strength with respect to distance.

In some embodiments, the threshold geographical location can be based on an identification by an AP (e.g., AP 306) that the AP can hear a signal from the first access point at or within a threshold strength. For example, the RFNs can be distinguished based on a signal strength of −80 dBm—APs that receive less can define a new RFN while APs that experience that or a greater signal strength are dynamically grouped within the initial RFN. Accordingly, since AP 304 and AP 306 experience greater signal strength than −80 dBm with AP 302, they define RFN-A 312. Conversely, RFN-B 314 includes AP 308 and 310, which experiences less signal strength than −80 dBm with AP 302. The threshold strength can be set and/or changed by an administrator or a controller within the management service, and can account for any obstacles affecting the signal strength.

In some embodiments, while the network administrator can logically group related APs into a site (e.g., site 120 and site 122 of FIG. 1), APs within a site can be automatically/dynamically grouped into RFNs through Neighbor Discovery messages. All APs can periodically send Neighbor Messages at full power and the lowest possible data rate to probe the edges of propagation. APs that belong to the same site that can hear each other at signals stronger than −80 dBm can be organized into an RF neighborhood, like that depicted in FIG. 3.

In FIG. 4, AP 404, AP 406, and AP 408 dynamically grouped themselves into RFN-A 438 based on the distance and/or signal strength between the APs being within the threshold value (e.g., within 80 m or −80 dBm). Similarly, AP 410, AP 412, and AP 414 have dynamically grouped themselves into RFN-B 440; AP 416 has dynamically grouped itself into RFN-C 442; AP 418, AP 420, and AP 422 have dynamically grouped themselves into RFN-D 444; and AP 424 and AP 426 have dynamically grouped themselves into RFN-E 446.

In some embodiments, load balancer service 450 can direct AP telemetry 456 traffic to appropriate pods hosting the management service 402 based on a RFN_ID 460 (RF Neighborhood Identifier) received from the AP. RFN_ID 460 for example can be generated using the AP's media access control address (MAC_ADDR), Slot ID, Internet Protocol address (IP_ADDR (IPv4 or IPv6)), and/or Site_ID.

In some embodiments, load balancer service 450 can distribute AP telemetry 456 traffic based on their subscription to the site services and available number of pods. For sites having a similar number of AP loads, when the number of pods approximately equates to the number of Sites, load balancer service 450 can map all APs of the same site to the same pod. This way, it can minimize inter-Access Point RF Telemetry dependencies for RRM computations. While this method can add incremental benefits compared to the traditional methods, it can suffer in performance when the number of Wi-Fi APs belonging to the same site grows exponentially.

Therefore in some embodiments, RF awareness can be added to load balancer service 450. Based on the load prediction, when thousands of APs are subscribed to a single site, for example, associating a single pod for all these APs would result in suboptimal operations. In order to solve this problem, load balancer service 450 can employ a method of tagging a hash identifier (HASH_ID) based on the geographical neighborhood using techniques like cookies. When an AP initiates telemetry 456 traffic, load balancer service 450 can look at the RFN_ID 460 sent in the header. In some embodiments, HASH_ID can be an identifier passed to the first AP in the neighborhood, and the RFN_ID 460 can be based on or a function of the HASH_ID.

Figure 5:
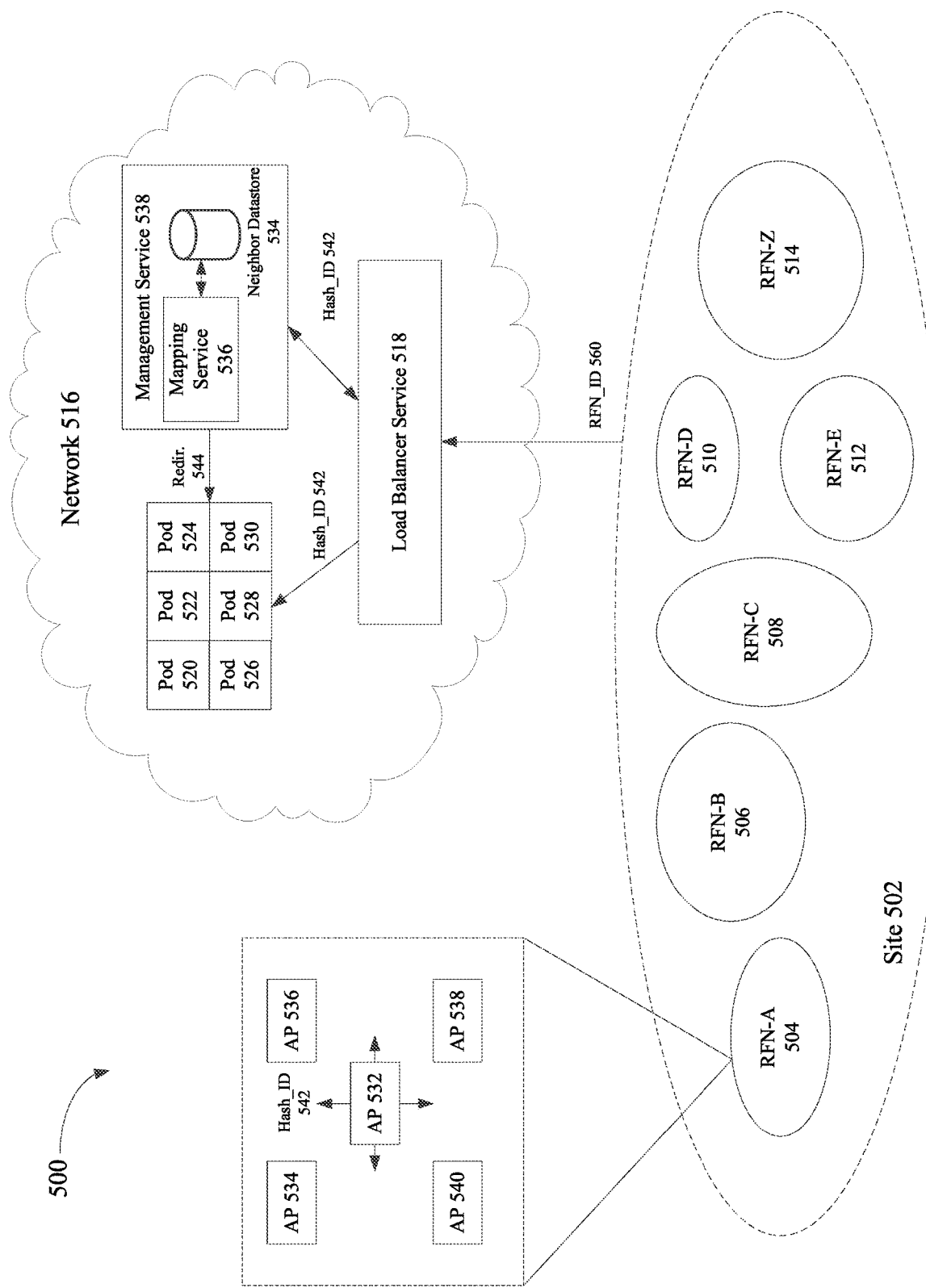
FIG. 5 illustrates an example network environment for collecting telemetry from access points in accordance with some embodiments.

For example, load balancer service 450 can distribute telemetry 456 from an RFN to a corresponding pod that handles telemetry from the RFN. In some embodiments the pods can be associated with one or more RFNs. For example, pod 430 can receive telemetry 456 from the APs within RFN-A 438, pod 432 can receive telemetry 456 from the APs within RFN-B 440, pod 434 can receive telemetry 456 from the APs within RFN-D 444, and pod 436 can receive telemetry 456 from the APs within RFN-C 442 and RFN-E 446. In some embodiments, management service 428 can auto-scale with load, meaning there could be multiple instances of a management application (RRM App 452) running side-by-side, processing incoming data at any given time Once an AP joins or is detected by system 400, the load balancer service 450 can receive, from the AP, the HASH_ID 542 in a header associated with telemetry from the AP (step 216). In some embodiments, the AP can inherit the HASH_ID 542 based on being assigned to a specific RFN. The load balancer service 450 can receive and then pass telemetry associated with RFN_ID 460, which can be based/inherited from HASH_ID 542) to the management service 428, which can direct the telemetry to the correct pod. FIG. 5, for example, illustrates an example network environment for collecting telemetry from access points based on RFN_ID 560 in accordance with some embodiments.

System 500 can include multiple RFNs within site 502 (e.g., RFN-A 504, RFN-B 506, RFN-C 508, RFN-D 510, RFN-E 512, and RFN-Z 514). Each RFN can have one or more APs within a threshold distance and/or signal strength. Like FIGS. 1 and 4, the RFNs can be in communication with network 516 through load balancer service, which can direct telemetry from an RFN to a certain pod based on the AP's RFN_ID 560. For example, pod 520 can be associated with RFN-A 504, pod 522 can be associated with RFN-B 506, pod 524 can be associated with RFN-C 508, pod 526 can be associated with RFN-D 510, pod 528 can be associated with RFN-E 512, and pod 530 can be associated with RFN-Z 514, each association based on a unique RFN_ID 560. The AP's RFN_ID 560 can be sent within traffic headers to load balancer service 518 in order to direct telemetry to the appropriate pod.

Accordingly, in some embodiments a pod (e.g., pod 520) can receive telemetry data from an assigned AP (e.g., AP 532), where each of the APs of the dynamically determined RFN can self-monitor its surroundings. For example, AP 532 can self-monitor surrounding APs based on the Neighborhood Discovery Protocol (NDP), and can dynamically associate a new AP (e.g., AP 534) with RFN-A 504 based on determining that it is within the threshold distance and/or signal strength.

The telemetry data 456 can include one or more key performance metrics associated with interference, noise, utilization, and/or radar performance. Any change in an AP's channel, channel width or Tx power can immediately have an impact on other APs within the same RFN. Hence, Management Service's 428 channel and power plans can be further optimized for the entire RFN based on monitoring the key performance metrics on a continuous basis.

For green-field deployment at the very initial access point subscription (e.g., AP 532 within RFN-A 504), load balancer service 518 can query mapping service 536 within management service 538 that maintains a holistic view of all the current neighbor relationships in a neighbor datastore 534. If AP 532 doesn't belong to an existing RFN, and is not within range of an existing RFN, then a new HASH_ID 542 can be computed in order to create a new RFN around AP 532. Mapping service 536 can then either redirect 544 the AP's stream to an existing pod with available resources or convey the new HASH_ID 542 to load balancer service 518 for redirection. Furthermore, neighbor datastore 534 can enlist an end to end view of all bi-directional neighbors and enable an efficient search within neighbor datastore 534 when a newer node is getting looked up in the database.

In some embodiments, once the generated HASH_ID 542 is communicated back to AP 532, it can start advertising it in the Neighbor Discovery Protocol (NDP) in order to broadcast the new HASH_ID 542 to its immediate neighbors, such as AP 534, AP 536, AP 538, and AP 540. This way, any newer APs that get installed would identify a neighbor's HASH_ID 542 within the RFN during its boot up scan. All subsequent Wi-Fi APs that belong to the local RFN of AP 532 would inherit its neighbor's HASH_ID 542. As NDP is encrypted with 128-bit AES, it securely provisions neighbor's HASH against DDoS attacks. An RFN_ID 560 can be based on the inherited HASH_ID 542 that would identify an associated AP with the neighborhood.

In order to avoid oversubscription to a single pod even within the same site, in some embodiments RF Boundary conditions can be enforced to ensure smaller localized RF Sectors within a single site. In the example above, a customer with one large site that is expanded across multiple buildings can form multiple RFN_IDs per local area, building or even per floor to isolate disjointed RFNs into multiple RFNs. Each RFN would have one anchor node/AP that gets a unique HASH_ID 542 based on the anchor AP's identity. All other APs that belong to the RFN would result in inheriting the anchor node's/AP's HASH_ID 542.

Load balancer service 518 can then simply steer different APs with a custom HASH_ID 542 or RFN_ID 560, or can redirect any APs in a potentially newer RFN to mapping service 536 to have it assigned to a newer hash. Hence load balancer service 518 can distribute APs based on the newer RF Neighborhood based HASH_ID 542 and therefore promote efficient load-balancing for larger scale deployments with potentially millions of nodes or more.

In some embodiments load balancer service 518 can receive, from AP 534, the RFN_ID 560 in a header associated with telemetry from AP 534, where AP 534 has inherited the HASH_ID 542 based on being assigned to RFN-A 504 (step 216). Load balancer service 518 can direct telemetry from AP 534 towards the single instance on the pod 520 (step 218), where the pod 520 receives telemetry from all access points in the dynamically determined RFN-A 504.

Telemetry, such as key performance metrics from AP members of the dynamically determined RFN-A 504, can be received by load balancer service 518, and based on analyzing the one or more key performance metrics, pod 520 can determine a best band, channel, channel width, and/or power for each AP within the dynamically determined RFN-A 504. The key performance metrics can be continuously updated as each of the AP members of the dynamically determined RFN-A 504 sends updates to the telemetry data as radio frequency (RF) conditions change over time.

Figure 6:
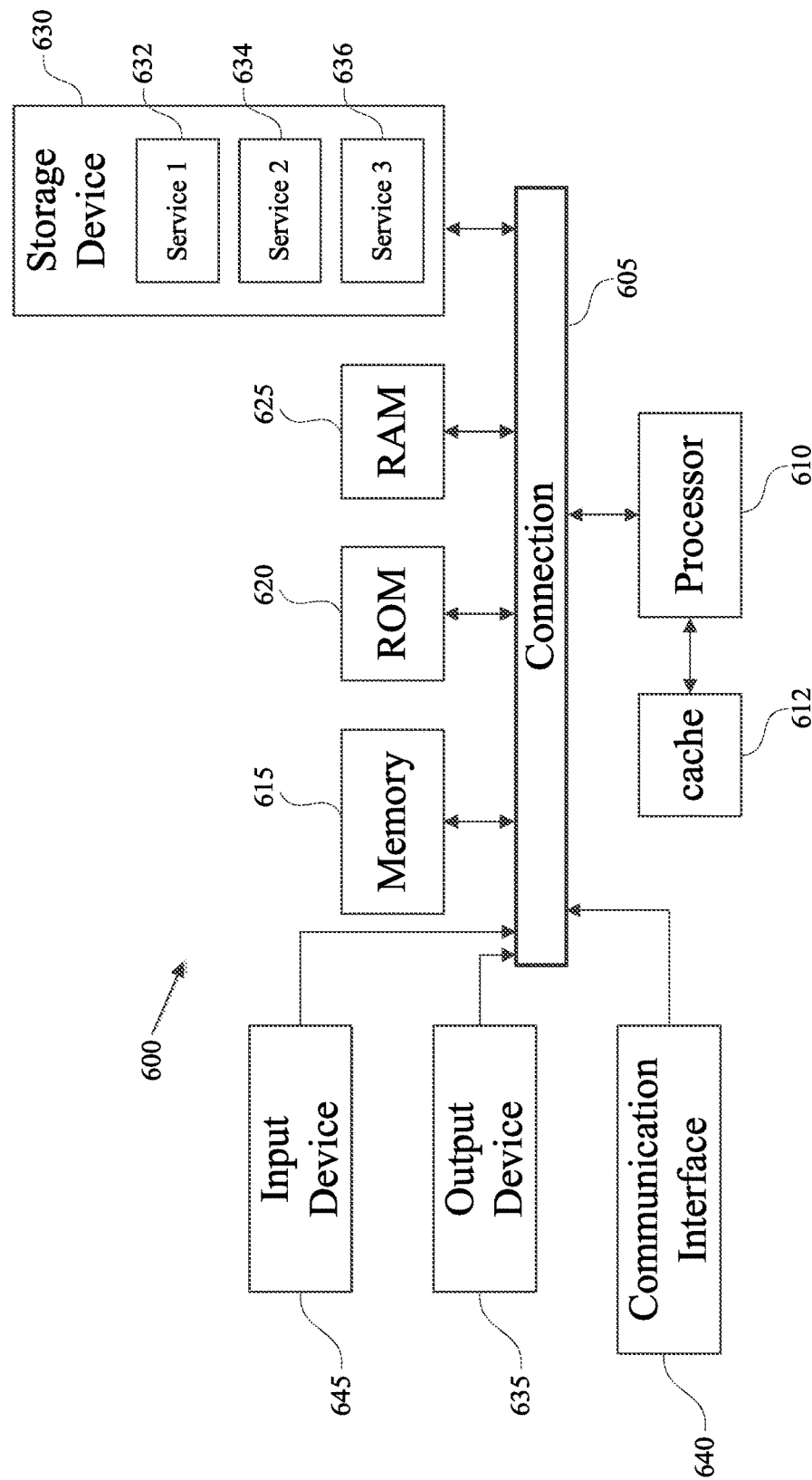
FIG. 6 shows an example of a system for implementing certain aspects of the present technology in accordance with some embodiments.

FIG. 6 shows an example of computing system 600 in which the components, such as the components of FIGS. 1, 3, 5, and 5, of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for collecting access point telemetry comprising:
    identifying a first access point at a site associated with a single instance on a pod of a management service, wherein the site and the management service are connected via a network;
    identifying a hash identifier for a radio frequency (RF) neighborhood of the first access point at the site based on a geographical location of the first access point at the site, wherein the RF neighborhood is one of a plurality of RF neighborhoods at the site, each RF neighborhood of the plurality of RF neighborhoods including at least one access point;
    dynamically determining subsequent access point members of the RF neighborhood by dynamically assigning a second access point to the RF neighborhood of the plurality of RF neighborhoods at the site based on the second access point being within a threshold geographical location to the first access point at the site; and
    directing telemetry from the second access point towards the single instance on the pod, wherein the pod receives telemetry for access points in the dynamically determined RF neighborhood.

2. The method of claim 1, wherein the threshold geographical location is based on an identification by the second access point that the second access point can hear a signal from the first access point at a threshold strength.

3. The method of claim 1, the method further comprising:
    receiving, from the second access point, the hash identifier in a header associated with traffic from the second access point, wherein the second access point inherits the hash identifier based on being assigned to the RF neighborhood.

4. The method of claim 1, wherein each of the access point members of the dynamically determined RF neighborhood self-monitors their surroundings.

5. The method of claim 1, wherein the telemetry includes one or more key performance metrics associated with interference, noise, utilization, and radar performance.

6. The method of claim 5, further comprising:
    receiving the one or more key performance metrics from the second access point and access point members of the dynamically determined RF neighborhood; and
    based on analyzing the one or more key performance metrics, determining a best band, channel, channel width, or power for each access point within the dynamically determined RF neighborhood.

7. The method of claim 5, wherein the one or more key performance metrics is continuously updated as each of the access point members of the dynamically determined RF neighborhood send updates to the telemetry as radio frequency (RF) conditions change over time.

8. A system for collecting access point telemetry, the system comprising:
   a first access point at a site in communication with a single instance on a pod of a management service within a network, wherein the site and the management service are connected via a network;
   a second access point in communication with the network; and
   the management service for determining radio frequency (RF) neighborhoods, the management service to:
      identify the first access point associated with a single instance on a pod;
      identify a hash identifier for the RF neighborhood of the first access point at the site based on a geographical location of the first access point at the site, wherein the RF neighborhood is one of a plurality of RF neighborhoods at the site, each RF neighborhood of the plurality of RF neighborhoods including at least one access point;
      dynamically determine subsequent access point members of the RF neighborhood by dynamically assigning the second access point to the RF neighborhood of the plurality of RF neighborhoods at the site based on the second access point being within a threshold geographical location to the first access point; and
      direct telemetry from the second access point towards the single instance on the pod, wherein the pod receives telemetry for access points in the dynamically determined RF neighborhood.

9. The system of claim 8, wherein the threshold geographical location is based on an identification by the second access point that the second access point can hear a signal from the first access point at a threshold strength.

10. The system of claim 8, wherein the management service further:
   receives, from the second access point, the hash identifier in a header associated with traffic from the second access point, wherein the second access point inherits the hash identifier based on being assigned to the RF neighborhood.

11. The system of claim 8, wherein each of the access point members of the dynamically determined RF neighborhood self-monitors their surroundings.

12. The system of claim 8, wherein the telemetry includes one or more key performance metrics associated with interference, noise, utilization, and radar performance.

13. The system of claim 12, wherein the management service further:
   receives the one or more key performance metrics from the second access point and access point members of the dynamically determined RF neighborhood; and
   based on analyzing the one or more key performance metrics, determines a best band, channel, channel width, or power for each access point within the dynamically determined RF neighborhood.

14. The system of claim 12, wherein the one or more key performance metrics is continuously updated as each of the access point members of the dynamically determined RF neighborhood send updates to the telemetry as radio frequency (RF) conditions change over time.

15. A non-transitory computer-readable medium comprising instructions stored thereon, the instructions executable by one or more processors of a computing system to:
   identify a first access point at a site associated with a single instance on a pod of a management service, wherein the site and the management service are connected via a network;
   identify a hash identifier for a radio frequency (RF) neighborhood of the first access point at a site based on a geographical location of the first access point at the site, wherein the RF neighborhood is one of a plurality of RF neighborhoods at the site, each RF neighborhood of the plurality of RF neighborhoods including at least one access point site;
   dynamically determine subsequent access point members of the RF neighborhood by dynamically assigning a second access point to the RF neighborhood of the plurality of RF neighborhoods at the site based on the second access point being within a threshold geographical location to the first access point at a site; and
   direct telemetry from the second access point towards the single instance on the pod, wherein the pod receives telemetry for access points in the dynamically determined RF neighborhood.

16. The non-transitory computer-readable medium of claim 15, wherein the threshold geographical location is based on an identification by the second access point that the second access point can hear a signal from the first access point at a threshold strength.

17. The non-transitory computer-readable medium of claim 15, the instructions further executable by one or more processors of a computing system to:
   receive, from the second access point, the hash identifier in a header associated with traffic from the second access point, wherein the second access point inherits the hash identifier based on being assigned to the RF neighborhood.

18. The non-transitory computer-readable medium of claim 15, wherein each of the access point members of the dynamically determined RF neighborhood self-monitors their surroundings.

19. The non-transitory computer-readable medium of claim 15, wherein the telemetry includes one or more key performance metrics associated with interference, noise, utilization, and radar performance.

20. The non-transitory computer-readable medium of claim 19, the instructions further executable by one or more processors of a computing system to:
   receive the one or more key performance metrics from the second access point and access point members of the dynamically determined RF neighborhood; and
   based on analyzing the one or more key performance metrics, determine a best band, channel, channel width, or power for each access point within the dynamically determined RF neighborhood.

* * * * *